United States Patent
Mariet et al.

(10) Patent No.: US 10,139,829 B1
(45) Date of Patent: Nov. 27, 2018

(54) USER INTERFACE FOR DISPLAYING OBJECT-BASED INDICATIONS IN AN AUTONOMOUS DRIVING SYSTEM

(71) Applicant: Waymo LLC, Mountain View, CA (US)

(72) Inventors: Robertus Christianus Elisabeth Mariet, Sunnyvale, CA (US); Manuel Christian Clement, Felton, CA (US); Philip Nemec, San Jose, CA (US); Brian Douglas Cullinane, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 15/295,433

(22) Filed: Oct. 17, 2016

Related U.S. Application Data

(63) Continuation of application No. 14/542,799, filed on Nov. 17, 2014, now Pat. No. 9,501,058, which is a continuation of application No. 14/171,904, filed on Feb. 4, 2014, now Pat. No. 8,903,592, which is a
(Continued)

(51) Int. Cl.
*B60W 50/14* (2012.01)
*G05D 1/02* (2006.01)
*G06K 9/00* (2006.01)

(52) U.S. Cl.
CPC ........... *G05D 1/0238* (2013.01); *B60W 50/14* (2013.01); *G06K 9/00805* (2013.01); *B60W 2050/146* (2013.01)

(58) Field of Classification Search
CPC .... G08G 1/166; G01C 21/367; G05D 1/0246; G05D 1/0214
See application file for complete search history.

(56) References Cited

U.S. PATENT DOCUMENTS

| | | |
|---|---|---|
| D205,596 S | 8/1966 | Marti et al. |
| D273,799 S | 5/1984 | Darrell |
| D277,113 S | 1/1985 | Gordon |

(Continued)

OTHER PUBLICATIONS

Lighting Panels—Big Lights, by Jibin, codepen.io [online], published Jun. 29, 2016, [retrieved Oct. 27, 2016], retrieved from the Internet <URL:http://codepenio/jmathew1991/pen/EyKXav>.

(Continued)

*Primary Examiner* — Drew J Brown
(74) *Attorney, Agent, or Firm* — Lerner, David, Littenberg, Krumholz & Mentlik, LLP

(57) ABSTRACT

A vehicle has a plurality of control apparatuses, a user input, a geographic position component, an object detection apparatus, memory, and a display. A processor is also included and is programmed to receive the destination information, identify a route, and determine the current geographic location of the vehicle. The processor is also programmed to identify an object and object type based on object information received from the object detection apparatus and to determine at least one warning characteristic of the identified object based on at least one of: the object type, a detected proximity of the detected object to the vehicle, the location of the detected object relative to predetermined peripheral areas of the vehicle, the current geographic location of the vehicle, and the route. The processor is also configured to select and display on the display an object warning image based on the at least one warning characteristic.

20 Claims, 11 Drawing Sheets

Related U.S. Application Data continuation of application No. 13/796,037, filed on Mar. 12, 2013, now Pat. No. 8,676,431.

(56) References Cited

U.S. PATENT DOCUMENTS

| | | |
|---|---|---|
| D289,621 S | 5/1987 | Tanaka et al. |
| 4,937,570 A | 6/1990 | Matsukawa et al. |
| D323,492 S | 1/1992 | Fulton et al. |
| 5,272,483 A | 12/1993 | Kato |
| 5,317,323 A | 5/1994 | Kennedy et al. |
| 5,323,321 A | 6/1994 | Smith, Jr. |
| 5,392,388 A | 2/1995 | Gibson |
| 5,526,341 A | 6/1996 | Shiba et al. |
| 5,638,279 A | 6/1997 | Kishi et al. |
| 5,732,385 A | 3/1998 | Nakayama et al. |
| 5,739,772 A | 4/1998 | Nanba et al. |
| 5,739,773 A | 4/1998 | Morimoto et al. |
| 5,838,562 A | 11/1998 | Gudat et al. |
| 5,874,905 A | 2/1999 | Nanba et al. |
| 5,925,090 A | 7/1999 | Poonsaengsathit |
| 5,925,091 A | 7/1999 | Ando |
| 5,929,787 A | 7/1999 | Mee et al. |
| 5,951,621 A | 9/1999 | Palalau et al. |
| 5,983,161 A | 11/1999 | Lemelson et al. |
| 6,049,755 A | 4/2000 | Lou et al. |
| D425,499 S | 5/2000 | Millington |
| D428,397 S | 7/2000 | Palalau et al. |
| 6,087,961 A | 7/2000 | Markow |
| 6,163,269 A | 12/2000 | Millington et al. |
| D438,874 S | 3/2001 | Flamini |
| 6,199,012 B1 | 3/2001 | Hasegawa |
| 6,212,472 B1 | 4/2001 | Nonaka et al. |
| 6,275,773 B1 | 8/2001 | Lemelson et al. |
| 6,360,167 B1 | 3/2002 | Millington et al. |
| 6,388,578 B1 | 5/2002 | Fagan et al. |
| 6,434,482 B1 | 8/2002 | Oshida et al. |
| D465,161 S | 11/2002 | Truisi |
| 6,484,094 B1 | 11/2002 | Wako |
| 6,487,500 B2 | 11/2002 | Lemelson et al. |
| 6,516,262 B2 | 2/2003 | Takenaga et al. |
| 6,522,347 B1 | 2/2003 | Tsuji et al. |
| 6,718,258 B1 | 4/2004 | Barton |
| 6,728,605 B2 | 4/2004 | Lash et al. |
| D493,471 S | 7/2004 | McIntosh |
| 6,771,189 B2 | 8/2004 | Yokota |
| D500,766 S | 1/2005 | Hanisch et al. |
| D501,210 S | 1/2005 | Cook |
| 6,999,875 B2 | 2/2006 | Tu |
| D535,207 S | 1/2007 | Skaggs |
| D536,340 S | 2/2007 | Jost et al. |
| D544,495 S | 6/2007 | Evans et al. |
| D544,496 S | 6/2007 | Evans et al. |
| D544,876 S | 6/2007 | Yamazaki et al. |
| D552,121 S | 10/2007 | Carl et al. |
| D552,122 S | 10/2007 | Carl et al. |
| 7,289,019 B1 | 10/2007 | Kertes |
| D561,193 S | 2/2008 | O'Mullan et al. |
| D566,722 S | 4/2008 | Jackson |
| D568,336 S | 5/2008 | Miglietta et al. |
| 7,376,510 B1 | 5/2008 | Green |
| 7,430,473 B2 | 9/2008 | Foo et al. |
| D586,359 S | 2/2009 | Makoski et al. |
| D596,191 S | 7/2009 | Rath et al. |
| 7,564,376 B2 | 7/2009 | Jang |
| D599,284 S | 9/2009 | Misumi |
| D599,375 S | 9/2009 | Wipplinger |
| D600,704 S | 9/2009 | LaManna et al. |
| D601,169 S | 9/2009 | LaManna et al. |
| D601,571 S | 10/2009 | Vu et al. |
| D602,033 S | 10/2009 | Vu et al. |
| D606,091 S | 12/2009 | O'Donnell et al. |
| D606,551 S | 12/2009 | Willis |
| 7,663,533 B2 | 2/2010 | Toennesen et al. |
| D611,951 S | 3/2010 | Katzer |
| D615,096 S | 5/2010 | Muhlfelder |
| D619,593 S | 7/2010 | Fujioka et al. |
| D619,614 S | 7/2010 | O'Mullan et al. |
| 7,802,205 B2 | 9/2010 | Bedingfield |
| D625,317 S | 10/2010 | Jewitt et al. |
| D627,360 S | 11/2010 | Aarseth |
| D628,590 S | 12/2010 | Vandeberghe et al. |
| 7,865,310 B2 | 1/2011 | Nakano et al. |
| 7,869,938 B2 | 1/2011 | Wako |
| D636,398 S | 4/2011 | Matas |
| 7,925,438 B2 | 4/2011 | Lo |
| 7,941,269 B2 | 5/2011 | Laumeyer et al. |
| 7,949,964 B2 | 5/2011 | Vimme |
| 7,963,656 B2 | 6/2011 | Kuno et al. |
| D641,762 S | 7/2011 | Matas |
| 7,979,172 B2 | 7/2011 | Breed |
| 7,979,173 B2 | 7/2011 | Breed |
| D644,243 S | 8/2011 | Matas |
| D644,661 S | 9/2011 | Gardner et al. |
| D645,470 S | 9/2011 | Matas |
| D645,873 S | 9/2011 | Cavanaugh et al. |
| 8,036,823 B2 | 10/2011 | Akita et al. |
| 8,040,253 B2 | 10/2011 | Kaller et al. |
| D649,558 S | 11/2011 | Matas |
| 8,050,863 B2 | 11/2011 | Trepagnier et al. |
| D650,793 S | 12/2011 | Impas et al. |
| D650,798 S | 12/2011 | Impas et al. |
| D651,613 S | 1/2012 | Ouilhet |
| 8,116,974 B2 | 2/2012 | Cummings |
| 8,126,642 B2 | 2/2012 | Trepagnier et al. |
| D664,464 S | 7/2012 | Muller |
| D665,163 S | 8/2012 | Leifeld et al. |
| 8,258,978 B2 | 9/2012 | Greasby |
| 8,260,537 B2 | 9/2012 | Breed |
| 8,271,193 B2 | 9/2012 | Nezu |
| D669,497 S | 10/2012 | Lee et al. |
| D669,499 S | 10/2012 | Gardner et al. |
| D672,256 S | 12/2012 | Behar |
| 8,326,529 B2 | 12/2012 | Kang |
| D673,982 S | 1/2013 | Miller |
| 8,346,426 B1 | 1/2013 | Szybalski et al. |
| 8,346,465 B2 | 1/2013 | Panganiban et al. |
| 8,355,862 B2 | 1/2013 | Matas et al. |
| D676,857 S | 2/2013 | MacManus et al. |
| 8,384,532 B2 | 2/2013 | Szczerba et al. |
| D678,304 S | 3/2013 | Yakoub et al. |
| D679,730 S | 4/2013 | Tyler et al. |
| D681,052 S | 4/2013 | Woo |
| 8,428,873 B2 | 4/2013 | Chau et al. |
| D681,667 S | 5/2013 | Phelan |
| 8,452,337 B2 | 5/2013 | Kim |
| D683,755 S | 6/2013 | Phelan |
| D684,188 S | 6/2013 | Kocmick et al. |
| 8,464,182 B2 | 6/2013 | Blumenberg et al. |
| D686,240 S | 7/2013 | Lin |
| D686,245 S | 7/2013 | Gardner et al. |
| D687,057 S | 7/2013 | Plitkins |
| 8,479,120 B2 | 7/2013 | Nezu |
| 8,515,664 B2 | 8/2013 | Spindler et al. |
| 8,543,335 B2 | 9/2013 | Gruijters et al. |
| D690,718 S | 10/2013 | Thomsen et al. |
| D690,720 S | 10/2013 | Waldman |
| D690,737 S | 10/2013 | Wen et al. |
| D692,444 S | 10/2013 | Lee et al. |
| 8,560,231 B2 | 10/2013 | Vu et al. |
| D694,257 S | 11/2013 | McKinley et al. |
| D695,300 S | 12/2013 | Lee et al. |
| D695,308 S | 12/2013 | Lee |
| 8,618,952 B2 | 12/2013 | Mochizuki |
| D698,363 S | 1/2014 | Asai |
| 8,635,019 B2 | 1/2014 | Tertoolen |
| D699,750 S | 2/2014 | Pearson et al. |
| 8,676,431 B1 | 3/2014 | Mariet et al. |
| D702,251 S | 4/2014 | Kotler et al. |
| D702,257 S | 4/2014 | Wantland et al. |
| D704,220 S | 5/2014 | Lim et al. |
| D705,805 S | 5/2014 | Schweizer |
| D705,808 S | 5/2014 | Anzures et al. |
| D706,791 S | 6/2014 | Sassoon |
| D706,814 S | 6/2014 | Phelan |

(56) References Cited

U.S. PATENT DOCUMENTS

| | | |
|---|---|---|
| D708,221 S | 7/2014 | Danton et al. |
| D709,898 S | 7/2014 | Sloo et al. |
| D709,915 S | 7/2014 | Inose et al. |
| 8,775,068 B2 | 7/2014 | Pylappan |
| D710,367 S | 8/2014 | Quattrocchi |
| D710,370 S | 8/2014 | Inose et al. |
| D711,910 S | 8/2014 | Inose et al. |
| D712,911 S | 9/2014 | Pearson et al. |
| 8,838,321 B1 | 9/2014 | Ferguson |
| D715,313 S | 10/2014 | Hontz, Jr. |
| D715,808 S | 10/2014 | Ishimoto et al. |
| D716,319 S | 10/2014 | Fan et al. |
| D716,320 S | 10/2014 | Fan et al. |
| D716,325 S | 10/2014 | Brudnicki |
| D716,829 S | 11/2014 | Sik |
| D717,822 S | 11/2014 | Brotman et al. |
| 8,880,336 B2 | 11/2014 | van Os et al. |
| 8,884,789 B2 | 11/2014 | Wagner et al. |
| D719,578 S | 12/2014 | Inose et al. |
| D719,973 S | 12/2014 | Inose et al. |
| 8,930,139 B2 | 1/2015 | Goddard |
| 8,935,046 B2 | 1/2015 | Muhlfelder et al. |
| D722,069 S | 2/2015 | Lee et al. |
| D722,079 S | 2/2015 | Charles et al. |
| 8,963,702 B2 | 2/2015 | Follmer et al. |
| D725,144 S | 3/2015 | Johnson |
| 8,977,486 B2 | 3/2015 | Cho |
| 8,983,778 B2 | 3/2015 | McCarthy |
| D726,208 S | 4/2015 | Dorfmann et al. |
| D726,219 S | 4/2015 | Chaudhri et al. |
| D726,741 S | 4/2015 | Lee et al. |
| D727,336 S | 4/2015 | Allison et al. |
| D727,928 S | 4/2015 | Allison et al. |
| D728,616 S | 5/2015 | Gomez et al. |
| D729,260 S | 5/2015 | Ahn et al. |
| D729,273 S | 5/2015 | Mariet et al. |
| D729,274 S | 5/2015 | Clement et al. |
| D729,838 S | 5/2015 | Clement et al. |
| D730,366 S | 5/2015 | Brush et al. |
| D730,404 S | 5/2015 | Yu et al. |
| D730,405 S | 5/2015 | Yu et al. |
| 9,043,069 B1 | 5/2015 | Ferguson et al. |
| D731,541 S | 6/2015 | Lee |
| D731,542 S | 6/2015 | Clement et al. |
| D732,075 S | 6/2015 | Clement et al. |
| D733,722 S | 7/2015 | Ueda |
| D734,343 S | 7/2015 | Yamasaki et al. |
| D735,214 S | 7/2015 | Mariet et al. |
| 9,081,483 B2 | 7/2015 | Nezu |
| D736,223 S | 8/2015 | Park |
| D736,258 S | 8/2015 | Kim et al. |
| D736,820 S | 8/2015 | Clement et al. |
| D736,830 S | 8/2015 | Lyman et al. |
| 9,103,681 B2 | 8/2015 | McGavran et al. |
| D737,854 S | 9/2015 | Kim et al. |
| D738,244 S | 9/2015 | Shallice et al. |
| D738,380 S | 9/2015 | Nielsen |
| D739,872 S | 9/2015 | Bang et al. |
| 9,121,724 B2 | 9/2015 | Piemonte et al. |
| 9,146,125 B2 | 9/2015 | Vulcano et al. |
| D740,302 S | 10/2015 | Son et al. |
| D741,356 S | 10/2015 | Park et al. |
| D741,890 S | 10/2015 | Chaudhri et al. |
| D741,896 S | 10/2015 | Park et al. |
| D741,898 S | 10/2015 | Soegiono et al. |
| D741,904 S | 10/2015 | Clement et al. |
| 9,170,122 B2 | 10/2015 | Moore et al. |
| 9,171,464 B2 | 10/2015 | Khetan et al. |
| D743,438 S | 11/2015 | Inose et al. |
| 9,182,243 B2 | 11/2015 | van Os et al. |
| D744,365 S | 12/2015 | Rogers |
| D744,535 S | 12/2015 | Shin et al. |
| D745,046 S | 12/2015 | Shin et al. |
| 9,200,915 B2 | 12/2015 | Vulcano et al. |
| 9,201,421 B1 | 12/2015 | Fairfield et al. |
| 9,221,461 B2 | 12/2015 | Ferguson et al. |
| D747,352 S | 1/2016 | Lee et al. |
| D747,731 S | 1/2016 | Oliveira |
| 9,239,245 B2 | 1/2016 | Ishikawa et al. |
| D750,130 S | 2/2016 | Baumann |
| 9,269,178 B2 | 2/2016 | Piemonte et al. |
| D750,663 S | 3/2016 | Mariet et al. |
| D753,715 S | 4/2016 | Clement et al. |
| D753,717 S | 4/2016 | Mariet et al. |
| D753,718 S | 4/2016 | Mariet et al. |
| D753,719 S | 4/2016 | Mariet et al. |
| D753,720 S | 4/2016 | Mariet et al. |
| D753,721 S | 4/2016 | Mariet et al. |
| D753,722 S | 4/2016 | Mariet et al. |
| D753,723 S | 4/2016 | Clement et al. |
| D753,724 S | 4/2016 | Clement et al. |
| D754,189 S | 4/2016 | Mariet et al. |
| D754,190 S | 4/2016 | Mariet et al. |
| D754,203 S | 4/2016 | Mariet et al. |
| D754,204 S | 4/2016 | Mariet et al. |
| D754,686 S | 4/2016 | Mandeville |
| 9,303,997 B2 | 4/2016 | McGavran et al. |
| 9,319,831 B2 | 4/2016 | Vulcano |
| D756,403 S | 5/2016 | Moon et al. |
| D760,276 S | 6/2016 | Huang et al. |
| D761,812 S | 7/2016 | Motamedi |
| D761,857 S | 7/2016 | Mariet et al. |
| D764,546 S | 8/2016 | Boria |
| D766,304 S | 9/2016 | Mariet et al. |
| D768,184 S | 10/2016 | Mariet et al. |
| D769,324 S | 10/2016 | Inose et al. |
| D769,935 S | 10/2016 | Hall |
| D771,681 S | 11/2016 | Mariet et al. |
| D771,682 S | 11/2016 | Mariet et al. |
| D772,274 S | 11/2016 | Mariet et al. |
| 9,501,058 B1 | 11/2016 | Mariet et al. |
| D773,517 S | 12/2016 | Mariet et al. |
| D778,292 S | 2/2017 | Mochizuki et al. |
| 2001/0027377 A1 | 10/2001 | Shimabara |
| 2002/0013659 A1 | 1/2002 | Kusama |
| 2002/0171685 A1 | 11/2002 | Christianson et al. |
| 2003/0050756 A1 | 3/2003 | McGovern |
| 2004/0204833 A1 | 10/2004 | Yokota |
| 2004/0204845 A1 | 10/2004 | Wong |
| 2004/0236507 A1 | 11/2004 | Maruyama et al. |
| 2005/0081148 A1 | 4/2005 | Deganello et al. |
| 2005/0102102 A1 | 5/2005 | Linn |
| 2005/0234612 A1 | 10/2005 | Bottomley et al. |
| 2005/0234639 A1 | 10/2005 | Endo et al. |
| 2005/0273256 A1 | 12/2005 | Takahashi |
| 2006/0031005 A1 | 2/2006 | Sakano et al. |
| 2006/0100774 A1 | 5/2006 | Barkowski et al. |
| 2006/0195231 A1 | 8/2006 | Diebold et al. |
| 2006/0195259 A1 | 8/2006 | Pinkus et al. |
| 2006/0247855 A1 | 11/2006 | de Silva et al. |
| 2007/0001830 A1 | 1/2007 | Dagci et al. |
| 2007/0136679 A1 | 6/2007 | Yang |
| 2007/0150179 A1 | 6/2007 | Pinkus et al. |
| 2007/0213092 A1 | 9/2007 | Geelen |
| 2007/0256030 A1 | 11/2007 | Bedingfield |
| 2008/0040024 A1 | 2/2008 | Silva |
| 2008/0040031 A1 | 2/2008 | Tu |
| 2008/0046274 A1 | 2/2008 | Geelen et al. |
| 2008/0082225 A1 | 4/2008 | Barrett |
| 2008/0126992 A1 | 5/2008 | Scheu et al. |
| 2008/0161986 A1 | 7/2008 | Breed |
| 2008/0162043 A1 | 7/2008 | Emoto et al. |
| 2008/0167801 A1 | 7/2008 | Geelen et al. |
| 2008/0167811 A1 | 7/2008 | Geelen |
| 2008/0208450 A1 | 8/2008 | Katzer |
| 2008/0208469 A1 | 8/2008 | Obradovich et al. |
| 2008/0288165 A1 | 11/2008 | Suomela et al. |
| 2008/0312827 A1 | 12/2008 | Kahlow et al. |
| 2009/0005980 A1 | 1/2009 | Nakao et al. |
| 2009/0012709 A1 | 1/2009 | Miyazaki |
| 2009/0024321 A1 | 1/2009 | Bando et al. |
| 2009/0037094 A1 | 2/2009 | Schmidt |
| 2009/0046111 A1 | 2/2009 | Joachim et al. |
| 2009/0063041 A1 | 3/2009 | Hirose et al. |

(56) References Cited

U.S. PATENT DOCUMENTS

| | | |
|---|---|---|
| 2009/0063048 A1 | 3/2009 | Tsuji |
| 2009/0083665 A1 | 3/2009 | Anttila et al. |
| 2009/0096937 A1 | 4/2009 | Bauer et al. |
| 2009/0171561 A1 | 7/2009 | Geelen |
| 2009/0171578 A1 | 7/2009 | Kim et al. |
| 2009/0171580 A1 | 7/2009 | Nezu |
| 2009/0171582 A1 | 7/2009 | Stockinger et al. |
| 2009/0182497 A1 | 7/2009 | Hagiwara |
| 2009/0187335 A1 | 7/2009 | Muhlfelder et al. |
| 2009/0216431 A1 | 8/2009 | Vu et al. |
| 2009/0268946 A1 | 10/2009 | Zhang et al. |
| 2010/0045704 A1 | 2/2010 | Kim |
| 2010/0057358 A1 | 3/2010 | Winer et al. |
| 2010/0063663 A1 | 3/2010 | Tolstedt et al. |
| 2010/0087230 A1 | 4/2010 | Peh et al. |
| 2010/0191457 A1 | 7/2010 | Harada |
| 2010/0250116 A1 | 9/2010 | Yamaguchi et al. |
| 2010/0253602 A1 | 10/2010 | Szczerba et al. |
| 2010/0253688 A1 | 10/2010 | Cui et al. |
| 2010/0253918 A1 | 10/2010 | Seder et al. |
| 2010/0254019 A1 | 10/2010 | Cui et al. |
| 2010/0283591 A1 | 11/2010 | Schick |
| 2010/0292886 A1 | 11/2010 | Szczerba et al. |
| 2010/0299063 A1 | 11/2010 | Nakamura et al. |
| 2010/0312466 A1 | 12/2010 | Katzer et al. |
| 2010/0318573 A1 | 12/2010 | Yoshikoshi |
| 2011/0071818 A1 | 3/2011 | Jiang |
| 2011/0098918 A1 | 4/2011 | Siliski et al. |
| 2011/0112756 A1 | 5/2011 | Winkler et al. |
| 2011/0153166 A1 | 6/2011 | Yester |
| 2011/0153209 A1 | 6/2011 | Geelen |
| 2011/0193722 A1 | 8/2011 | Johnson |
| 2011/0208421 A1 | 8/2011 | Sakashita |
| 2011/0249005 A1 | 10/2011 | Hautvast |
| 2011/0285717 A1 | 11/2011 | Schmidt et al. |
| 2012/0035788 A1 | 2/2012 | Trepagnier et al. |
| 2012/0096383 A1 | 4/2012 | Sakamoto et al. |
| 2012/0143504 A1 | 6/2012 | Kalai et al. |
| 2012/0154591 A1 | 6/2012 | Baur et al. |
| 2012/0197839 A1 | 8/2012 | Vervaet et al. |
| 2012/0249456 A1 | 10/2012 | Taka et al. |
| 2012/0259539 A1 | 10/2012 | Sumizawa |
| 2012/0303263 A1 | 11/2012 | Nam et al. |
| 2012/0310530 A1 | 12/2012 | Lee |
| 2013/0035853 A1 | 2/2013 | Stout et al. |
| 2013/0070093 A1 | 3/2013 | Rivera et al. |
| 2013/0151145 A1 | 6/2013 | Ishikawa |
| 2013/0171590 A1 | 7/2013 | Kumar |
| 2013/0191020 A1 | 7/2013 | Emani et al. |
| 2013/0197736 A1 | 8/2013 | Zhu et al. |
| 2013/0325339 A1 | 12/2013 | McCarthy |
| 2013/0325342 A1 | 12/2013 | Pylappan et al. |
| 2013/0326425 A1 | 12/2013 | Forstall et al. |
| 2013/0328924 A1 | 12/2013 | Arikan et al. |
| 2013/0345980 A1 | 12/2013 | van Os et al. |
| 2014/0032049 A1 | 1/2014 | Moshchuk et al. |
| 2014/0039786 A1 | 2/2014 | Schleicher et al. |
| 2015/0113483 A1 | 4/2015 | Van Der Westhuizen et al. |
| 2015/0254983 A1 | 9/2015 | Mochizuki et al. |
| 2015/0325271 A1 | 11/2015 | Kim et al. |
| 2016/0062730 A1 | 3/2016 | Kwon et al. |
| 2017/0003853 A1 | 1/2017 | Min et al. |

OTHER PUBLICATIONS

Square Spinner, by Uco, codepen.io [online], published Jun. 6, 2015, [retrieved Oct. 27, 2016], retrieved from the Internet <URL:http://codepenio/escapism/pen!Vlbjwy>.

Pseudo Element Squared Spinner, by Hiswe, codepen.io [online], published Apr. 22, 2014, [retrieved Oct. 27, 2016], retrieved from the Internet <URL:http://codepen.io/Hiswe/pen/8HKql>.

USER INTERFACE FOR DISPLAYING OBJECT-BASED INDICATIONS IN AN AUTONOMOUS DRIVING SYSTEM

CROSS-REFERENCE TO RELATED APPLICATIONS

The present application is a continuation of U.S. patent application Ser. No. 14/542,799, filed Nov. 17, 2014, which is a continuation of U.S. patent application Ser. No. 14/171,904, filed Feb. 4, 2014, which is a continuation of U.S. patent application Ser. No. 13/796,037, filed Mar. 12, 2013, the entire disclosures of which are incorporated herein by reference.

BACKGROUND OF THE INVENTION

Field of the Invention

The invention relates generally to user interface applications for navigation and autonomous driving systems. More specifically, user interfaces for displaying information related to vehicles within the vicinity of an automobile.

Description of Related Art

Autonomous vehicles use various computing systems to transport passengers from one location to another. Some autonomous vehicles may require some initial input from an operator, such as a pilot, driver, or passenger while other systems may require continuous input. Other systems, for example autopilot systems, may be used only when the system has been engaged, thus the operator may switch from a manual to an autonomous mode where the vehicle drives itself.

A key component of an autonomous vehicle is the perception system, which allows the vehicle to perceive and interpret its surroundings during a trip. When the autonomous system is engaged, the system will make various decisions during the trip, for example, speed up, slow down, stop, etc. The operator may be unaware of the calculations or "reasoning" behind why the autonomous vehicle is taking some particular action. In order to feel safe and confident, the operator may want to know what the vehicle is planning to do in the immediate future and to be informed as to at least some of the factors influencing the system's reasoning.

Navigation systems may include electronic displays which appear to zoom in or out according to a vehicle's speed of travel to enable to user to identify where the vehicle may be within the next few seconds. Some of these systems provide real-time traffic information received via radio or satellite signals. However, these systems do not provide for the display of the speed, actual location of other vehicles or obstacles, or other useful information related to such vehicles or obstacles.

BRIEF SUMMARY OF THE INVENTION

An aspect of the present disclosure relates to a vehicle having a plurality of control apparatuses including a braking apparatus, an acceleration apparatus, and a steering apparatus. The vehicle further has a user input device for inputting destination information, a geographic position component for determining the current location of the vehicle, an object detection apparatus for detecting and identifying a type of an object in or proximate to a roadway, memory for storing a detailed roadway map including roadways, traffic signals, and intersections, and an electronic display for displaying information to a passenger. A processor is also included in the vehicle and is programmed to receive the destination information, identify a route to the destination, and determine, from location information received from the geographic position component and the stored map information, the current geographic location of the vehicle. The processor is also programmed to identify an object and object type based on object information received from the object detection apparatus and to determine at least one warning characteristic of the identified object based on at least one of: the object type, a detected proximity of the detected object to the vehicle, the location of the detected object relative to predetermined peripheral areas of the vehicle, the current geographic location of the vehicle, and the route. The processor is also configured to select an object warning image to be displayed based on the at least one warning characteristic and display the selected object warning image on the electronic display.

The processor can be further configured to identify a change in position of the identified object over time. In such an example, the at least one warning characteristic can relate to deceleration of the identified object when the identified object is positioned in front of the subject vehicle. In another example, the at least one warning characteristic can relate to one of the presence of the identified object toward the rear of the vehicle and within a predetermined distance thereof and the presence of the object within a blind spot of the vehicle.

Another aspect of the present disclosure relates to a vehicle having an object detection apparatus for detecting and identifying a type of an object in or proximate to a roadway and a location of the object and an electronic display for displaying information to a passenger. The vehicle also includes a processor programmed to identify an object and object type based on object information received from the object detection apparatus and determine a relative position of the object to the vehicle. The processor is further programmed to determine at least one warning characteristic of the identified object based on at least one of: the object type, a detected proximity of the detected object to the vehicle, and the relative position of the detected object. The processor is further programmed to determine one of a plurality of predetermined peripheral areas of the vehicle to associate with the warning characteristic based on the relative position of the detected object and to select an object warning image and a warning location image to be displayed based on the at least one warning characteristic and the predetermined peripheral area associated with the warning characteristic. The processor is further configured to display the selected object warning image and the selected warning location image on the electronic display and a preselected safe indication image associated with the predetermined peripheral areas not associated with the warning characteristic.

Another aspect of the present disclosure relates to a method for selecting images for display on a display apparatus of a vehicle. The method includes receiving destination information from a user input device, identifying a route to the destination, receiving location information from a geographic position component, accessing stored map information including roadways, traffic signals, and intersections, and determining, from the location information and the stored map information, the current geographic location of the vehicle. The method also includes identifying an object of a roadway and an object type based on object information received from an object detection apparatus, and determining at least one warning characteristic of the identified object based on at least one of: the object type, a detected proximity of the detected object to the vehicle, the location of the detected object relative to predetermined peripheral areas of the vehicle, the current geographic location of the vehicle, and the route. The method also includes selecting an object warning image to be displayed based on the at least one warning characteristic and displaying the selected object warning image on the electronic display.

DETAILED DESCRIPTION

Aspects, features and advantages of the invention will be appreciated when considered with reference to the following description of exemplary embodiments and accompanying figures. The same reference numbers in different drawings may identify the same or similar elements. Furthermore, the following description is not limiting; the scope of the invention is defined by the appended claims and equivalents.

Figure 1:
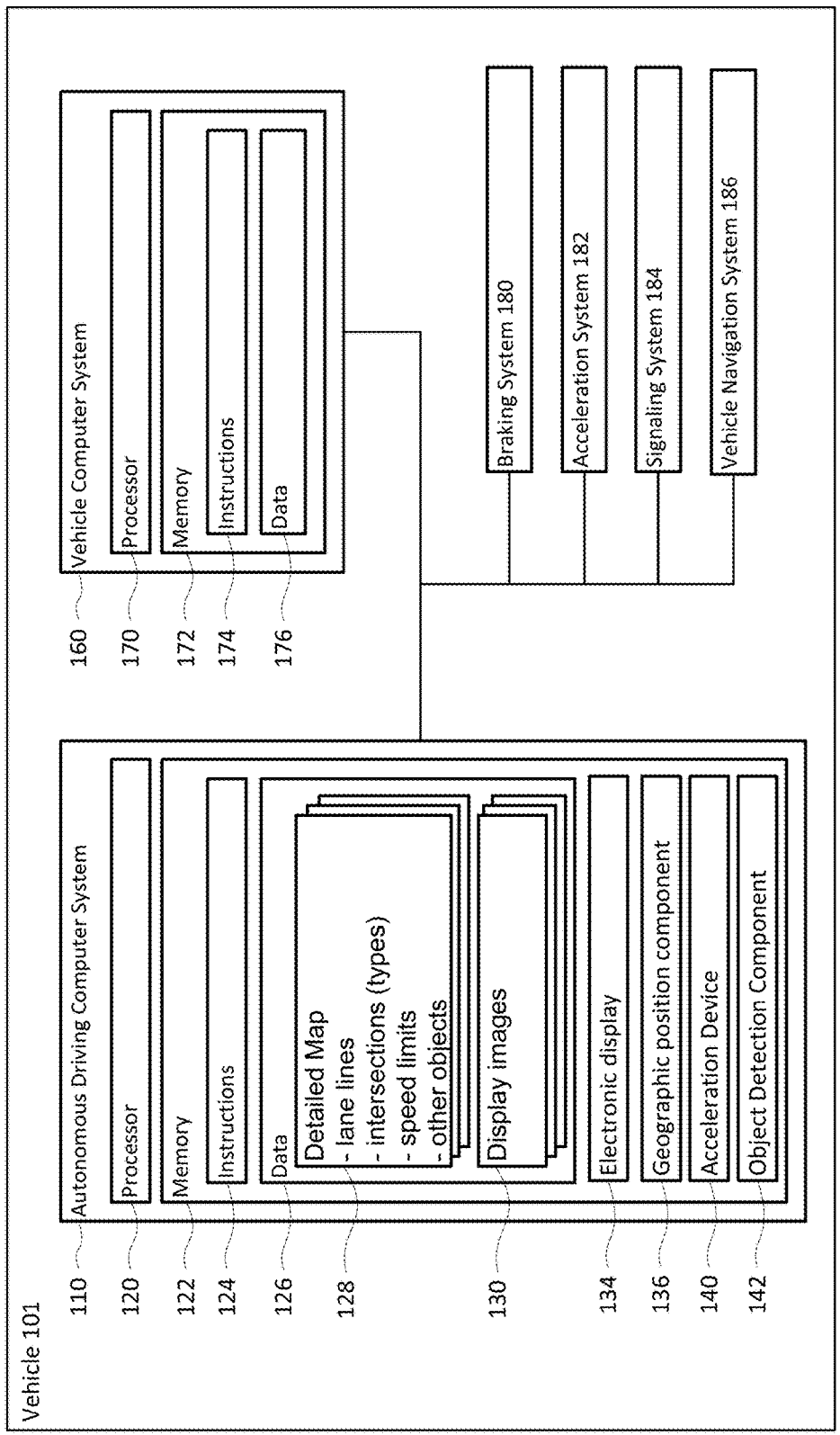
FIG. 1 is a functional diagram of a system in accordance with an aspect of the disclosure.

As shown in FIG. 1, an autonomous driving system 100 in accordance with one aspect of the invention includes a vehicle 101 with various components. The vehicle may have one or more computers, such as computer 110 containing a processor 120, memory 122 and other components typically present in general purpose computers.

The memory 122 stores information accessible by processor 120, including instructions 124 and data 126 that may be executed or otherwise used by the processor 120. The memory 122 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 124 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 126 may be retrieved, stored or modified by processor 120 in accordance with the instructions 124. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated device such as an ASIC. Although FIG. 1 functionally illustrates the processor, memory, and other elements of computer 110 as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

Computer 110 may include all of the components normally used in connection with a computer such as a central processing unit (CPU), memory (e.g., RAM and internal hard drives) storing data 126 and instructions such as a web browser, an electronic display 134 (e.g., a monitor having a screen, a small LCD touch-screen or any other electrical device that is operable to display information), and user input (e.g., a mouse, keyboard, touch-screen and/or microphone).

Computer 110 may also include a geographic position component 136 to determine the geographic location of the device. For example, computer 110 may include a GPS receiver to determine the device's latitude, longitude and/or altitude position. Other location systems such as laser-based localization systems, inertial-aided GPS, WiFi or cellular signal aided GPS, or camera-based localization may also be used.

Computer 110 may also include other features, such as an accelerometer, gyroscope or other acceleration device 140 to determine the direction in which the device is oriented. By way of example only, the acceleration device may determine its pitch, yaw or roll (or changes thereto) relative to the direction of gravity or a plane perpendicular thereto. In that regard, it will be understood that a computer's provision of location and orientation data as set forth herein may be provided automatically to the user, other computers of the network, or both.

Computer 110 may also include an object detection component 142 to detect and identify the location and movement (e.g. relative speed) of objects such as other vehicles, obstacles in the roadway, traffic signals, signs, etc. The detection system may include lasers, sonar, radar, cameras or any other such detection methods. For example, the object detector may include an imaging device to identify the state of a particular traffic signal as yellow or another color. In use, computer 110 may use this information to instruct the braking system of the vehicle to apply the brakes and to provide information regarding such objects to the passenger of the vehicle, as described further below.

Data 126 may include various types of information used by computer 110. Detailed map information 136 may include maps identifying lane lines, intersections, speed limits, traffic signals, buildings, signs, or other such information. For example, computer 110 may access detailed map information 136 in order to determine where the lane lines should be located on a particular highway and adjust the speed or direction of vehicle 101 accordingly. Computer 110 may also access display images 130, such as roadways, intersections, and other objects in order to provide a passenger of vehicle 101 with an understanding of what actions vehicle 101 will take in the immediate future.

In one example, computer 110 may be an autonomous driving computing system capable of communicating with a vehicle's internal computer such as computer 160. Computer 160 may be configured similarly to computer 110, for example, including a processor 170, memory 172, instructions 174, and data 176. Computer 110 may send and receive information from the various systems of vehicle 101, for example the breaking 180, acceleration 182, signaling 184, and navigation 186 systems in order to control the movement, speed, etc. of vehicle 101. It will be understood that although various systems and computers 110 and 160 are shown within vehicle 101, these elements may be external to vehicle 101 or physically separated by large distances.

Figure 2:
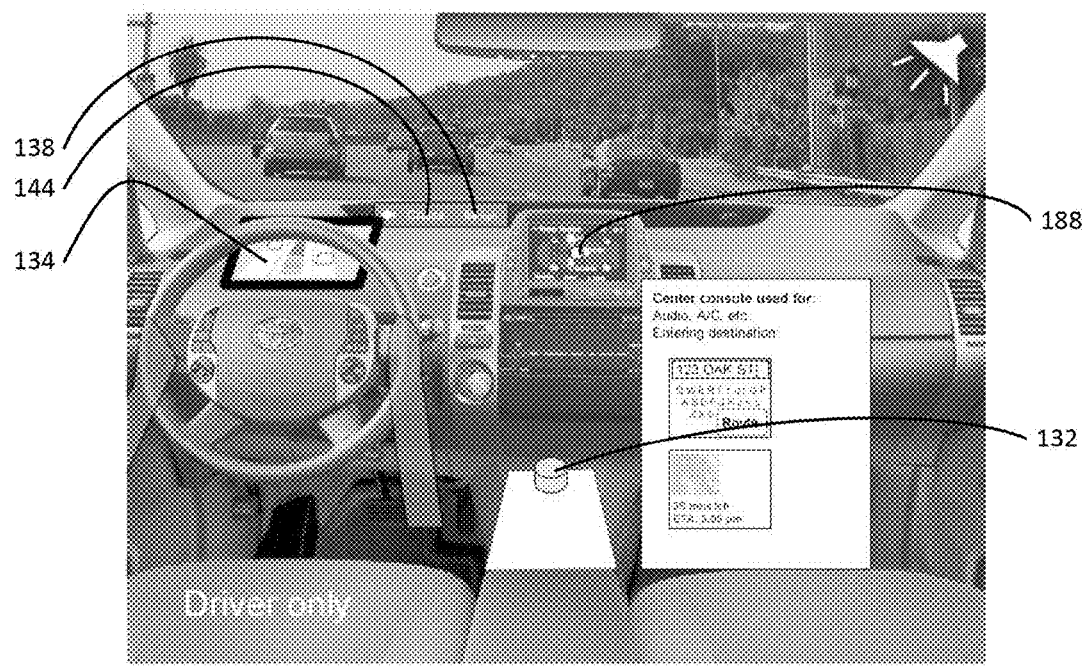
FIG. 2 is an exemplary design of the interior of an autonomous vehicle in accordance with an aspect of the disclosure.

FIG. 2 depicts an exemplary design of the interior of an autonomous vehicle. Vehicle 101 may display information to a passenger in a number of ways. For example, vehicle 101 may be equipped with an electronic display 134 for the autonomous driving system and an indicator 144 which identifies whether the autonomous driving system has been engaged. Vehicle 101 may also identify the current speed of travel 138 by displaying the information in a location visible to the passenger or identifying the speed audibly. Further, as shown in the figure, vehicle 101 may also include a second display 188 for displaying additional information such as that related to navigation functionality of the computer 110 (which can be used by the passenger when driving himself in a manual mode, or can be displayed to inform the user of a route used for autonomous driving in an autonomous mode). The display 188 can also display information related to an in-vehicle entertainment system.

Vehicle 101 may include one or more user input devices, such as device 132, for inputting information into the autonomous driving computer 110. For example, a user may input a destination, (e.g. 123 Oak Street), into the navigation system. The navigation system may generate a route between the present location of the vehicle and the destination. If the autonomous driving system is engaged, computer 110 may request or automatically receive the route information from the navigation system. Once a route has been determined, the autonomous driving system may drive the vehicle to the destination.

Figure 3:
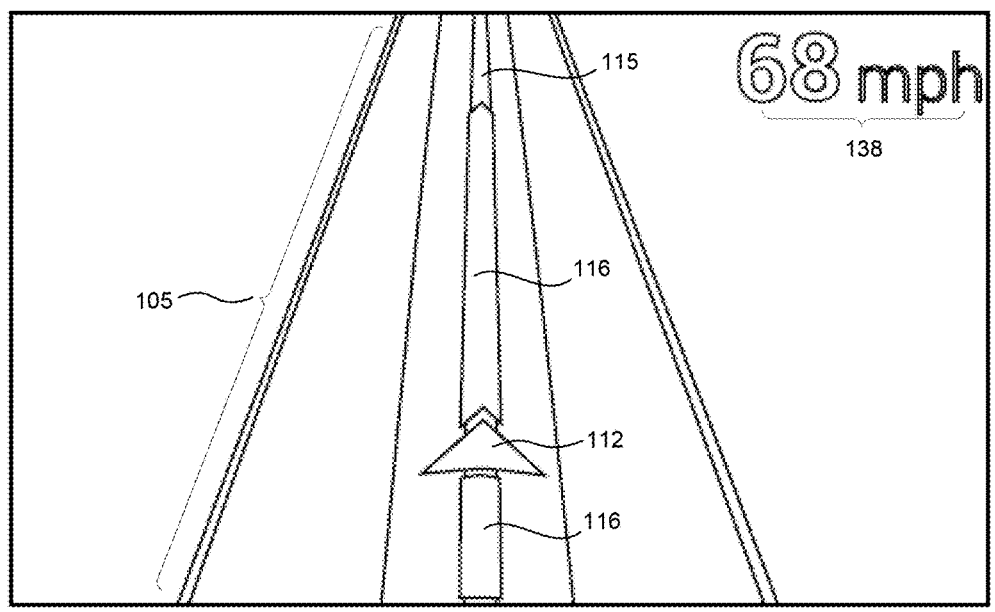
FIG. 3 is an exemplary screen shot in accordance with an aspect of the disclosure.

FIG. 3 is an exemplary screen shot of the display 134 of computer 110. The display may be used to identify to a passenger of the vehicle the current speed, location, orientation, etc. of vehicle 101 with respect to a relevant stretch of roadway 105. For example, vehicle 101 is depicted as a subject vehicle icon 112 on the screen. Any relevant object may be used to identify the vehicle to the user. The route along which the vehicle is traveling may be identified by a route line 115 extending from the vehicle. In the example of FIG. 3, the vehicle is moving forward, so route line 115 extends from the front of the vehicle. The display may also identify the speed indicator 138 of the device as well as the approximate path of the vehicle during the next few seconds, shown as path 116. The path 116 can also be configured to represent a head space in the direction of travel, as described further in U.S. Pat. No. 8,346,426, the entire disclosure of which is incorporated by reference herein.

Figure 4:
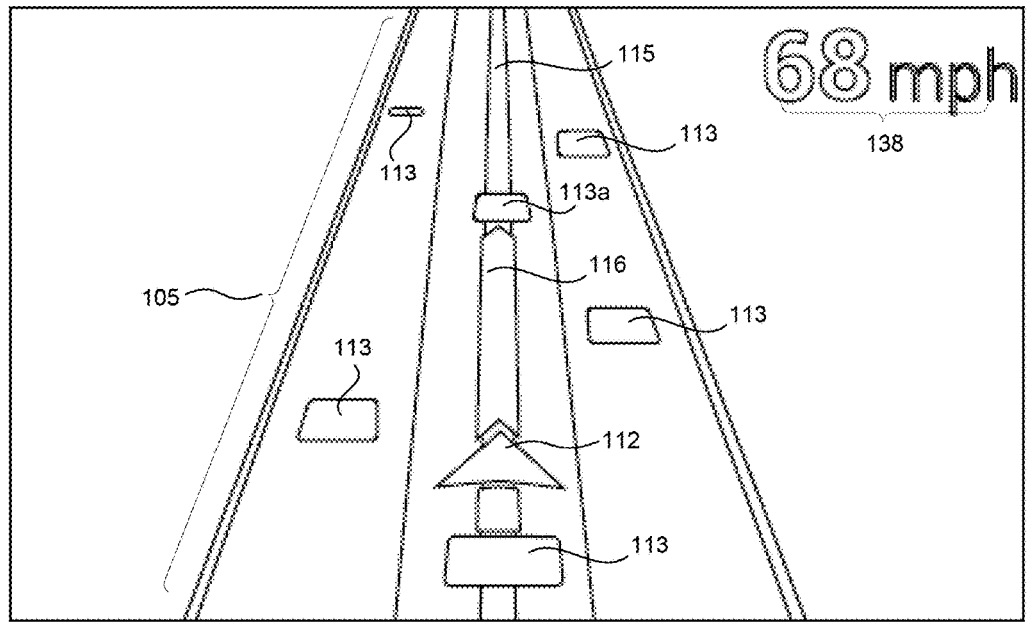
FIG. 4 is another exemplary screen shot in accordance with an aspect of the disclosure.

As shown in FIG. 4, the display may also identify other relevant objects. For example, where computer 110 has identified an object on the roadway (an "identified object") as another vehicle, the computer may display the vehicle as another icon, such as boxes 113, 113a, on the display in the approximate location of the roadway. The shape and size of the icon displayed may be selected by computer 110 based on the shape and size of actual vehicle, for example a compact vehicle may appear smaller than a tractor-trailer.

Figure 5:
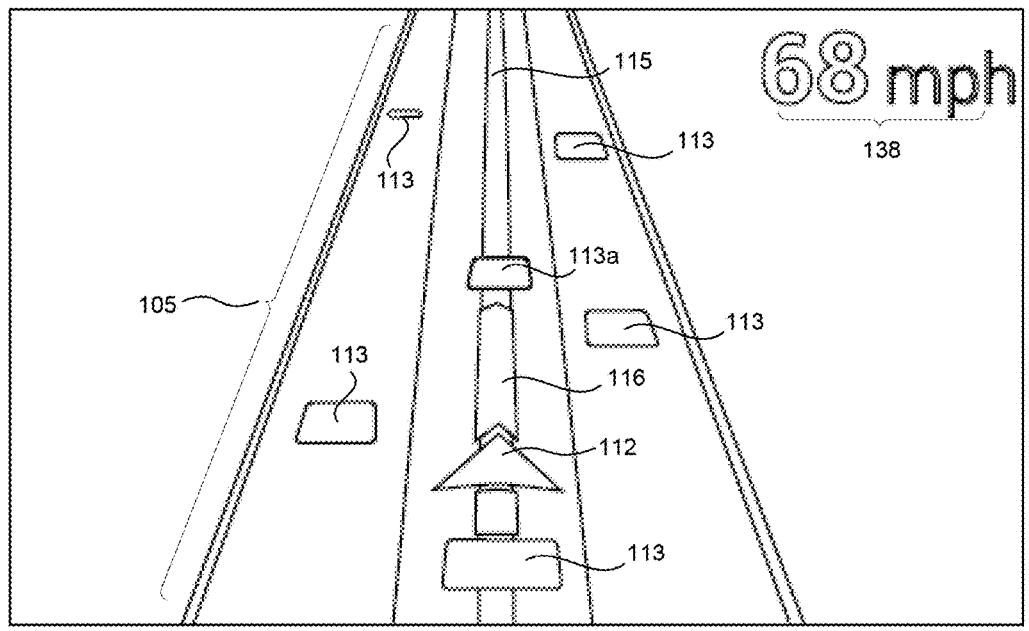
FIG. 5 is another exemplary screen shot in accordance with an aspect of the disclosure.

As vehicle 101 moves along the roadway, the location of objects detected by the vehicle, and the features of the roadway may change. These changes may be displayed in order to allow the user to understand that vehicle 101 is continuously monitoring the state of the vehicles, roadway and other objects. For example, as shown in FIG. 4, vehicle box 112 is driving along the roadway approaching a second vehicle identified as box 113a. Some time later, vehicle 101 moves closer to the second vehicle, and as shown in FIG. 5, the distance between vehicle box 112 and box 113a has decreased.

In addition to displaying representations (i.e. subject vehicle icon 112) of the vehicle 101, and additional representations of other vehicles, such as vehicle boxes 113, the computer 110 can be configured to provide warning information, via either display 134 or second display 188, regarding vehicles, or other objects, that are identified as being potentially problematic for vehicle 101. Potentially problematic objects can be those which are determined to be following too closely, vehicles positioned in front of vehicle 101 that are rapidly decelerating (e.g., braking abruptly), or other vehicles that are within a projected path of vehicle 101 or are potentially entering into the path of vehicle 101 in a way such that they may potentially collide with vehicle 101.

Other objects, such as vehicles, bicycles, or pedestrians, can be identified as potentially problematic simply based on their location relative to the vehicle 101. For example, a potentially problematic vehicle can be one that is driving in the blind spot of vehicle 101. The blind spot of a vehicle is generally identified as a location alongside of the vehicle that is between the line of sight of the rearview mirror and the adjacent side-view mirror. In an example a warning relating to a vehicle in the blind spot of vehicle 101 can be beneficial while the passenger of the vehicle is driving to prevent collision between should the driver wish to change lanes. In another example, a blind-spot warning can be beneficial to the passenger while the car is in an autonomous driving mode to notify the passenger of, for example, the vehicle's delay in changing lanes according to an otherwise predetermined autodriving path. Further, simply communicating such notifications to the passenger can give the passenger comfort in the fact that the computer is monitoring for such conditions, giving the passenger confidence in the autonomous driving system 100.

Figure 7:
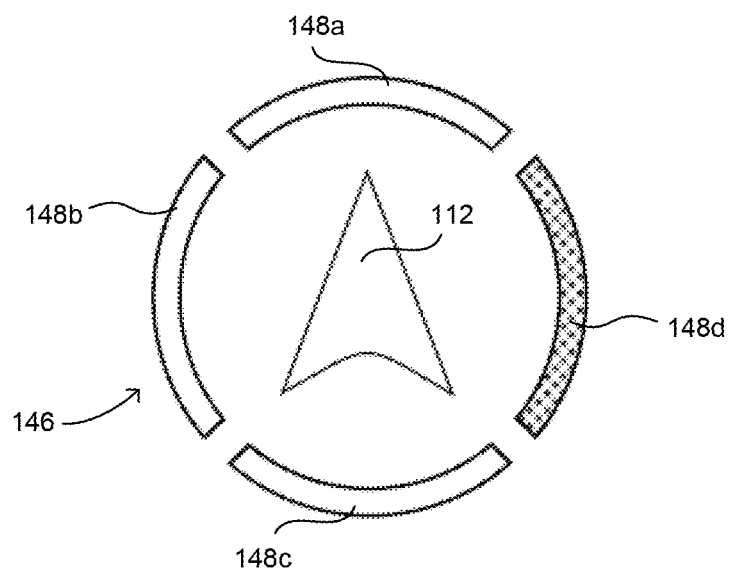
FIG. 7 is an illustration of a variation of the notification image of FIG. 6.

As shown in FIG. 7, the computer 110 can be configured, such by appropriate programming or the like, to present a notification image 146 on the display 134. In the example shown, notification image 146 is presented as a segmented circle that surrounds subject vehicle icon 112. Subject vehicle icon 112 can take any form, and can be configured to be identifiable by the drive as the subject vehicle 101. As shown in the figures, the representation of subject vehicle icon 112 does not have to resemble a vehicle and can be a shape such as a triangle or an arrowhead (sometimes referred to as a "chevron"). Notification image 146 can surround subject vehicle icon 112 and can include segments 148a-148d, that correspond to predetermined peripheral areas surrounding the vehicle such as in front of the vehicle 101 (segment 148a), to the rear of the vehicle 101 (segment 148c), the driver side (segment 148b) and passenger side (segment 148d) of the vehicle 101.

The segments 148 of the notification image 146 can be present, whether or not a specific warning is being communicated to the passenger by computer 110. In an example, when no warning is being communicated, the segments 148 can have an appearance to notify the passenger that no problematic objects are present. This can include presenting segments 148 in a color that is accepted to indicate a positive or neutral system status, such as green or blue, for example.

When a warning is to be communicated to the passenger of the vehicle 101, the segment 148 corresponding to the position of the object identified as potentially problematic (the "identified object") can change to a warning color, such as yellow, orange, or red, for example. FIG. 7 shows segment 148d with different shading from the remaining segments so as to represent such a difference in color. In one example, different colors can be used depending on the urgency of the potential problem associated with the identified object. In this example, yellow can be used to simply draw the passenger's attention to an identified object that does not pose an immediate problem, but that could upon a change in condition. For example, if an identified vehicle is present in the passenger side blind spot of vehicle 101, computer 110, can present segment 148d in yellow. If the vehicle 101 (such as when being driven by the passenger in a manual mode) begins to merge into the lane of the identified vehicle, segment 148d can be changed to orange, and if a collision is imminent, segment 148d can be changed to red. System 100 can be further configured to allow computer 110 to present an audible warning to the passenger, such as a horn or alarm, in the event of an elevated warning.

The manner in which the segments 148a-148d are associated with the predetermined peripheral positions around the vehicle 101 can vary. In one example, the divisions between the segments 148 can extend radially outward from the center of subject vehicle icon 112 to divide the area surrounding vehicle 101 into quadrants. In this example, the segment 148 associated with such a quadrant can change in appearance when a warning is to be presented in connection with an identified object in that quadrant. In another example, the areas associated with the segments 148 can overlap, such that an identified object that is, for example, positioned in front of the vehicle 101 to the passenger side thereof, can be associated with both segments 148a and 148d such that if that vehicle is an identified object for which a warning condition is to be presented, both segments 148a and 148d can change in appearance (e.g., color). In these or other possible configurations, multiple segments can change in appearance simultaneously to indicate multiple warnings associated with separate identified objects, such as a braking car to the front of the vehicle 101 and a car in a blind spot of the vehicle 101.

Figure 8:
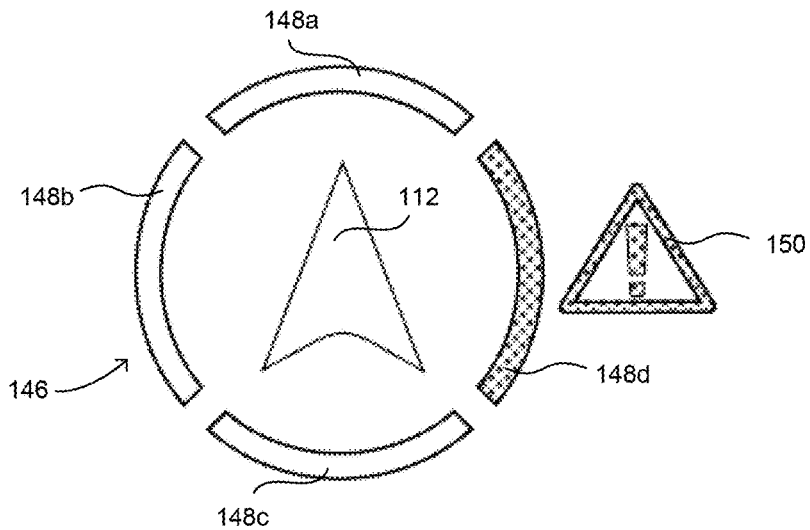
FIG. 8 is another configuration of the notification image of FIG. 7.
Figure 9:
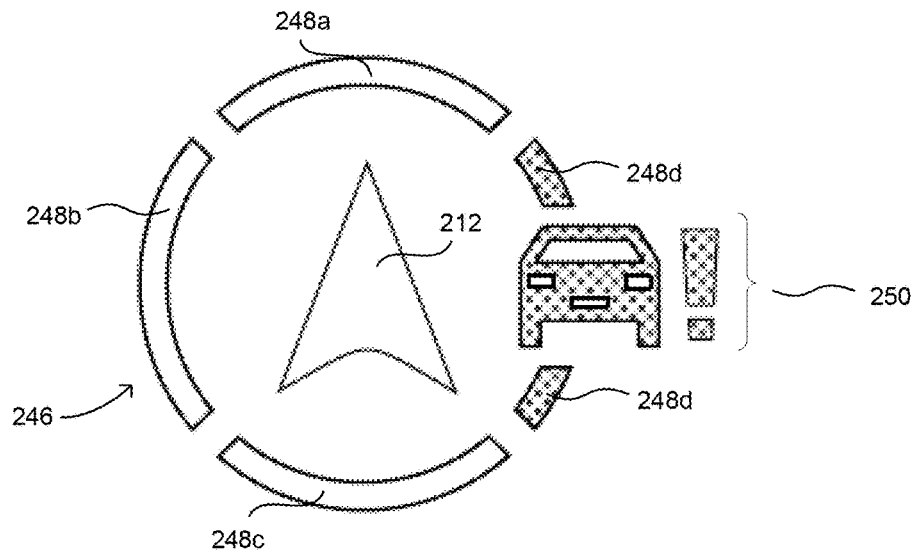
FIG. 9 is another configuration of the notification image of FIG. 7.

Computer 110 can be further configured to present a warning image in connection with the change of appearance of a segment, such as segment 148d in the example above. For example, as shown in FIG. 8, warning image 150 can be a simple symbol used to represent a warning, such as an exclamation point within a triangle shown. In another example, the warning image 150 can be configured to identify a characteristic of the identified object associated with the image. For example, and a shown in FIG. 9, if the computer 110 determines that the identified object is a car, an image of a car of the warning image 250, can be presented along with the indication provided by segments 248d. In other examples, representations of trucks, pedestrians, animals, cyclists, or the like can be presented to alert the passenger to identified objects of these (or other types), in such instances where computer 110 and the related object sensors 142 (described above) are sensitive or accurate enough to make such identifications.

Figure 10:
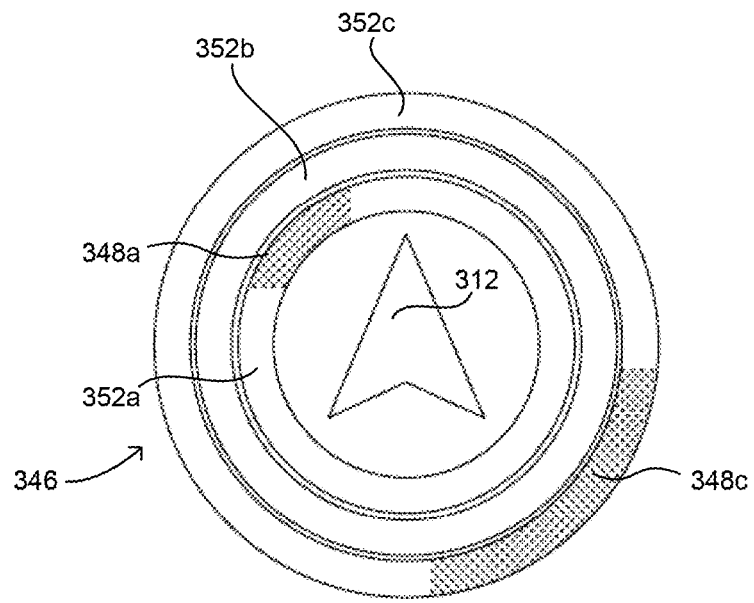
FIG. 10 is an illustration of an alternative notification image that can be used in connection with an aspect of the disclosure.

As shown in FIGS. 10-13, notification image 146 can be presented in a number of different ways. In the example of FIG. 10, notification image 346 can be a plurality of unsegmented signals that can change color within predetermined areas 348 to indicate a warning. Further the plurality of rings 152 can be concentrically arranged to indicate the proximity of the identified object with which the notification is associated. That is, closer objects can be signaled to the passenger by a color change within an area 348a of in inner ring 352a, while farther objects can be signaled to the passenger by a color change within an area 348c of outer ring 352c.

Figure 11:
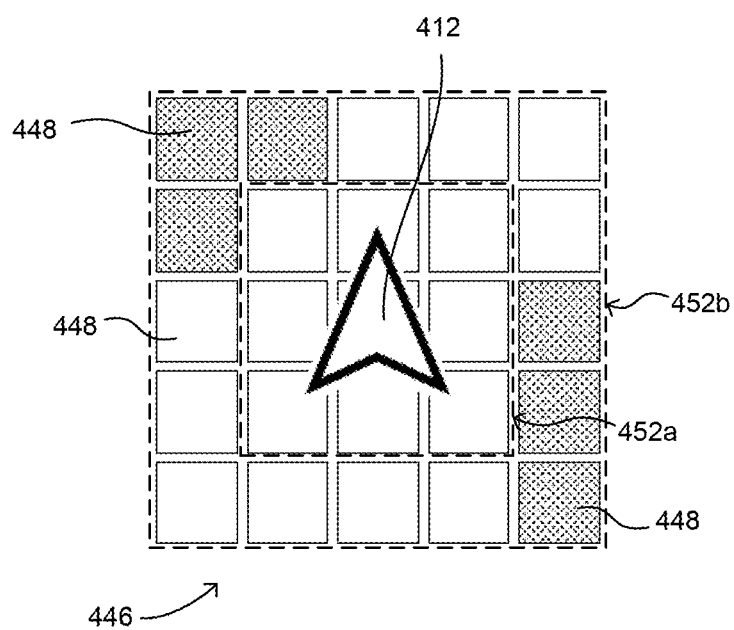
FIG. 11 is an illustration of an alternative notification image that can be used in connection with an aspect of the disclosure.

In another example, FIG. 11 shows notification images presented as a grid over which subject vehicle icon 412 is presented. As shown, the grid can have multiple layers, such as inner layer 452a and outer layer 452b that are respectively closer to and farther from subject vehicle icon 412. The varying layers (which can include more than the two shown in FIG. 11) can be used to indicate the proximity of the identified object to the vehicle 101, as discussed above in the example employing concentric circles. That is, an identified object within a predetermined distance of vehicle 101 (e.g. 10 feet) can be associated with a section 448 of the grid within inner layer 452a, and an identified object outside of such a predetermined distance can be associated with a section 448 within outer layer 452b. The particular section 448 within such a layer can be determined by associating the sections 448 with corresponding peripheral areas of the vehicle 101 according to the principles described above with respect to FIG. 8.

Figure 12:
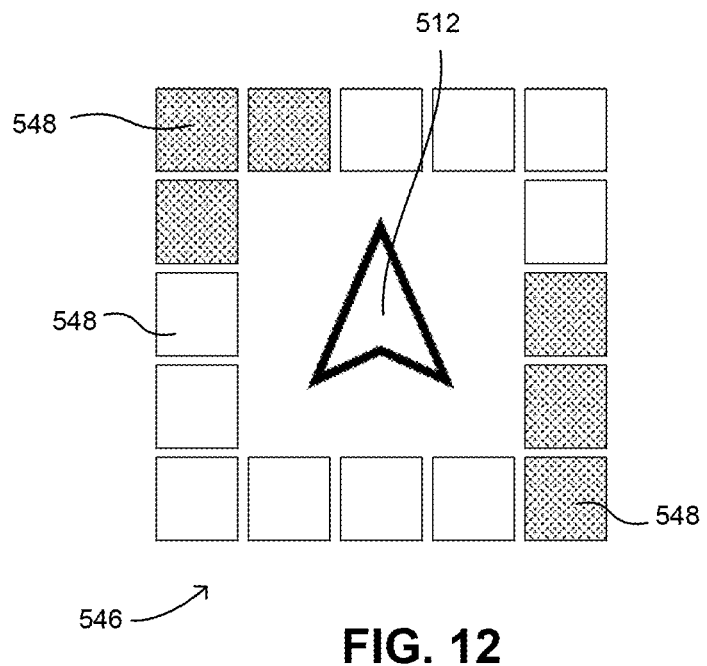
FIG. 12 is an illustration of an alternative notification image that can be used in connection with an aspect of the disclosure.

In another example, FIG. 12 shows a notification image 546 that is similar to that of FIG. 11, but with only a single layer of sections 548 set out in a grid surrounding subject vehicle icon 512. The sections 548 can be used to indicate the presence of a problematic identified object within an area designated by the respective sections 548 in the same manner as those discussed with respect to FIG. 11, but without the levels of proximity indication.

Figure 6:
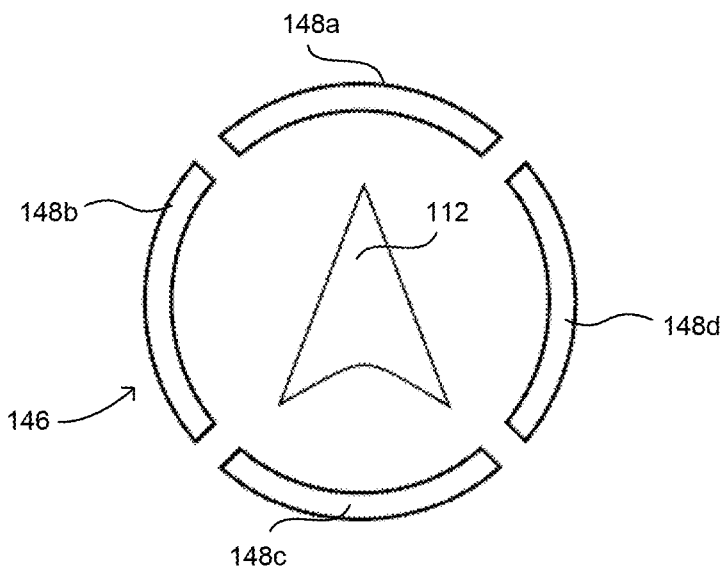
FIG. 6 is an illustration of a notification image that can be used in connection with an aspect of the disclosure.
Figure 13:
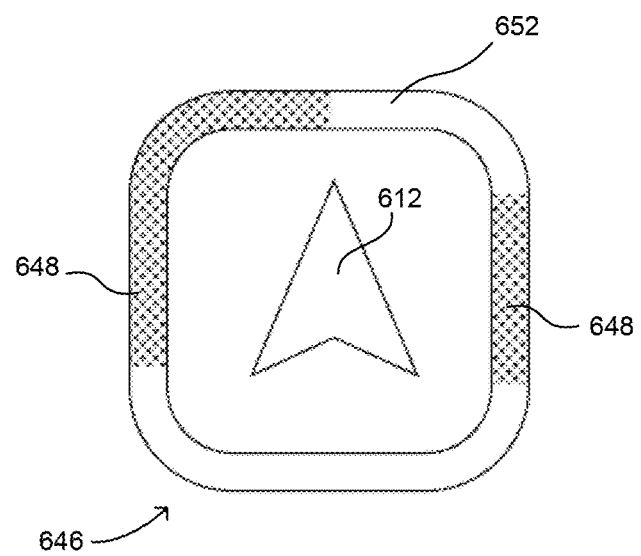
FIG. 13 is an illustration of an alternative notification image that can be used in connection with an aspect of the disclosure.

FIG. 13 shows another example of a notification image 646 that is in the form of an unsegmented square that encircles subject vehicle icon 612. Various areas 648 of the image 646 can be altered (such as by a change in color, as described above) to indicate the presence of a potentially problematic identified object within corresponding peripheral areas of vehicle 101 in a manner similar to the circles of FIG. 10. Further, the size of the areas 648, represented by the distance around image 646 that the areas 648 extend, can be presented in a way to indicate the size of the object (e.g., greater size for larger objects). In a variation, concentric squares could be presented in a manner similar to the circles of FIG. 10. Additionally or alternatively, the square could be segmented, as in the example of FIGS. 6-8. This or any of the other various notification images in FIGS. 9-13 can be presented on display 134 along with any of the warning images 150 shown in FIGS. 7 and 8.

Any of the various notification images shown in FIGS. 6-13 can be presented to the user on either display 134 or second display 188. In one example, the subject vehicle icon 112, the notification image 146, and any warning images 150 (if needed at any point) can be presented on primary display 134. Simultaneously with the images being presented on primary display 134 (or in the alternative thereto), subject vehicle icon 112, notification image 146 and any needed warning images 150 can be presented on secondary display 188. In the example shown in FIG. 14, these images can be incorporated into the presentations of the roadway images shown in FIGS. 3-5. That is, the subject vehicle icon 112 can be shown on the road image 105 in the location of vehicle 101 as determined by the system 100 using the global positioning components 136 thereof. Subject vehicle icon 112 can be presented over route line 115 and over path 116. Notification image 146 can be presented along with subject vehicle icon 112 surrounding it as if projected on the road image 105. As discussed above, other objects, such as vehicles, as identified by the object sensors of system 101 can also be represented on road 105 in the positions thereof relative to the vehicle 101 as boxes 113 on road 105.

Figure 14:
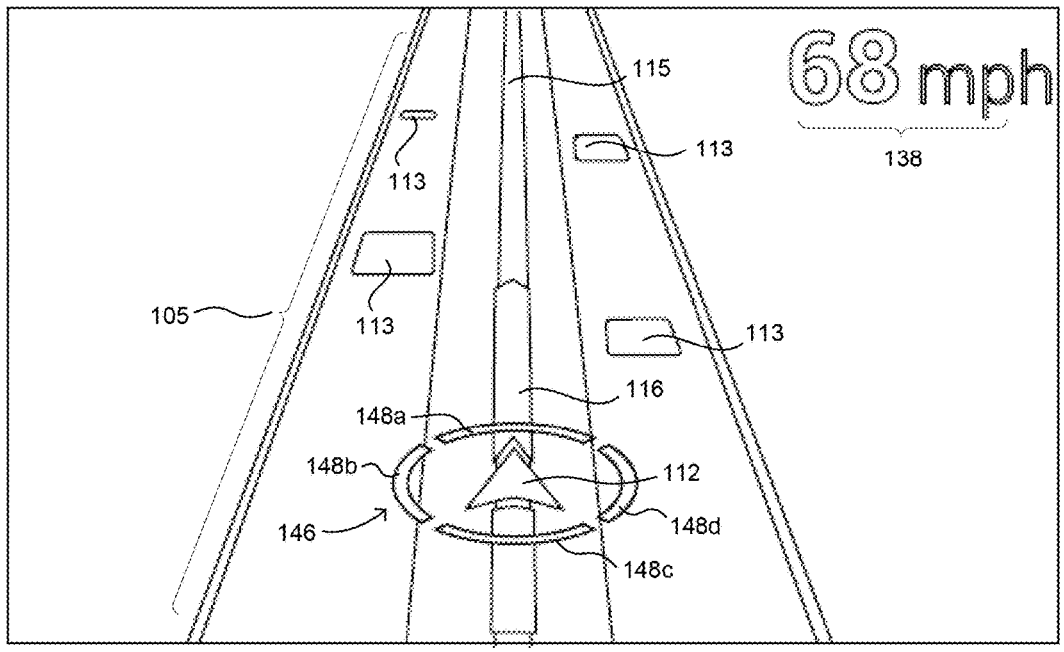
FIG. 14 is an exemplary screen shot in accordance with an aspect of the disclosure.
Figure 15:
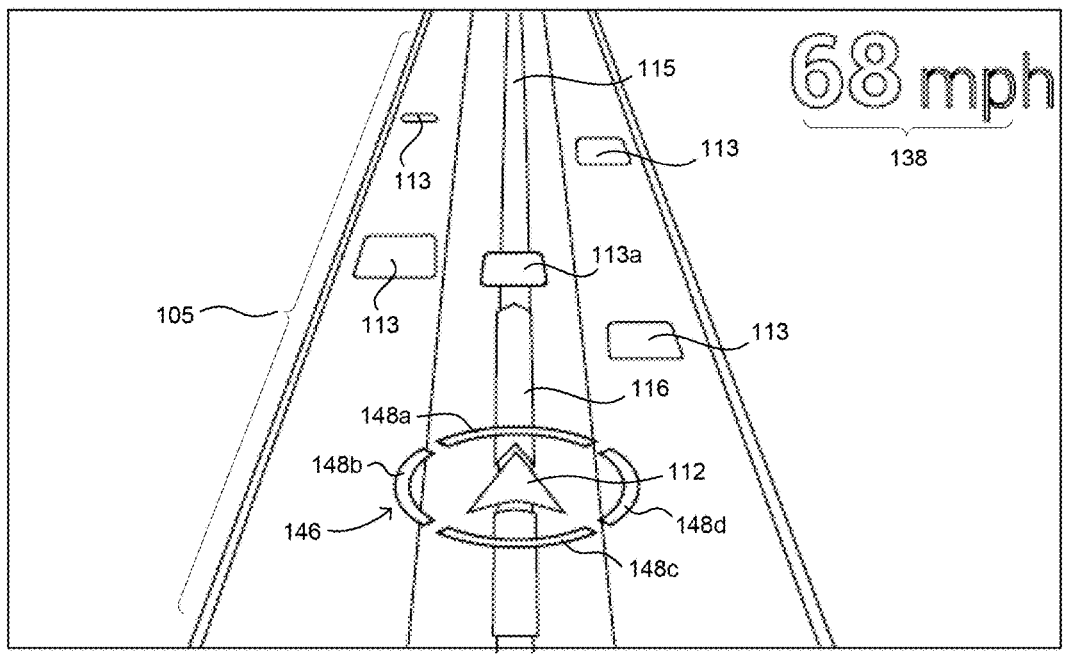
FIG. 15 is an exemplary screen shot in accordance with an aspect of the disclosure.
Figure 16:
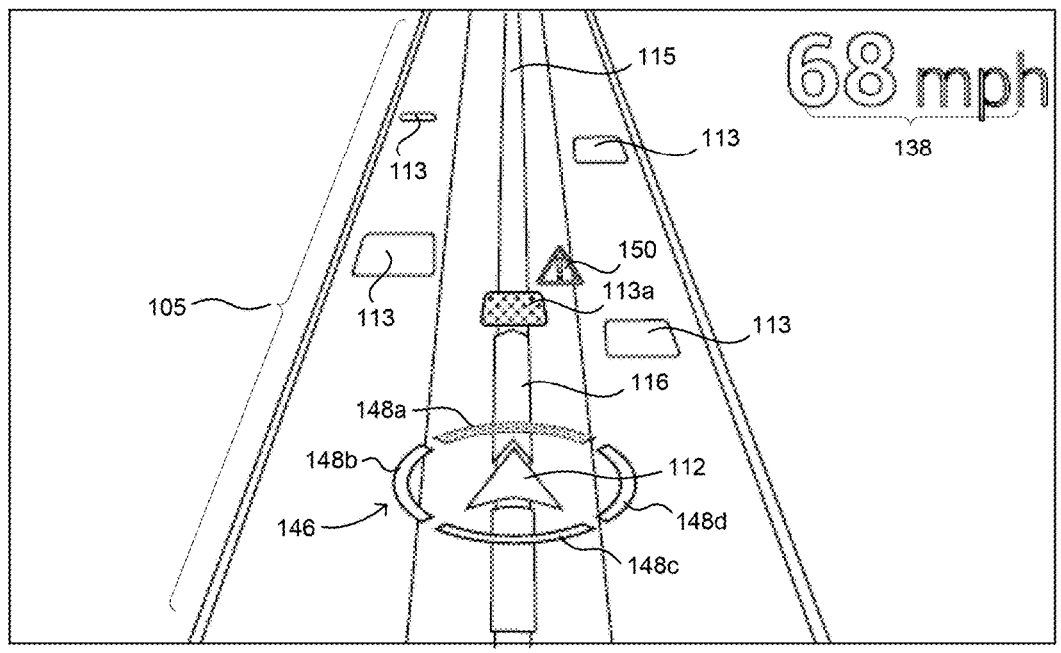
FIG. 16 is an exemplary screen shot in accordance with an aspect of the disclosure.

As shown in FIG. 14, when none of the other vehicles shown on the road image by boxes 113 have been identified by computer 110 as being potentially problematic to vehicle 101, notification image 146 can be shown in a non-warning state (such as all-green as discussed above). Similarly, if an identified object, such as object 113a in FIG. 15 is in front of vehicle 101, as indicated by subject vehicle image 112, at an appropriate distance, notification image 146 can be shown in a similar, non-warning state. If an identified object is determined by the system 101 to be potentially problematic, one or more segments 148 of notification image 146 can change in appearance to indicate such a warning state in an area associated with that segment, as discussed above. Further, the particular identified object that triggers such a notification image can be indicated by computer 110 on display 134. As shown in FIG. 16, if the vehicle indicated by box 113a, which is driving in front of vehicle 101, slows or brakes abruptly such that vehicle 101 should slow down accordingly or take action to avoid a collision, segment 148a can change in color, as discussed above, to indicate such a warning. Further, a warning image 150 can be presented in front of segment 148a, as shown in FIG. 16, and box 113a can be presented in a color to indicate that the warning image and corresponding notification are associated with a vehicle in front of vehicle 101. In an example, this can include a color change (as indicated by the shading tone of box 113a in FIG. 16) that can, for example, be to the same color as segment 148a and/or warning image 150.

In one example, the above-described warning can be used to alert the driver of vehicle 101 to a condition to help the driver avoid an accident or the like. In another example, when the system 101 is engaged in autonomous driving, such notifications or warning images can help communicate to a passenger the reasons for system 101 taking various actions. In the example shown in FIG. 15, the warning image, segment visual indication, and vehicle identification can be implemented as vehicle 101 approaches another vehicle, represented by box 113a, from behind. In such an instance, computer 110 may maintain an appropriate following distance and display a variation of the above-described notifications to the passenger. For example, in FIG. 15 subject vehicle icon 112 is shown as moving along roadway 105. As subject vehicle icon 112 approaches box 113a, box 113a may be changed, for example to yellow (or flash yellow, etc.). Simultaneously, segment 148a can change to yellow (or another appropriate color, for example). Such an indication can be used to notify the passenger as to the reason for vehicle 101 slowing down.

In another example, should the vehicle represented by box 113a brake or otherwise slow abruptly, vehicle 101, if engaged in autonomous driving, can automatically to do the same. In connection with this action, a notification can be made (and can in an example be presented in an urgent manner such as in red or the like) so that the passenger is made aware of the reason for the abrupt braking by vehicle 101. As shown in FIG. 16, a corresponding warning 150 image can be presented directly in front of segment 148a. In the alternative, the system can refrain from presenting warning images during autonomous driving, instead only changing the color of the relevant segment 148 and the box 113 associated with the identified object. In another example, a warning image 750 can be shown adjacent box 713a, as shown in FIG. 17.

Figure 17:
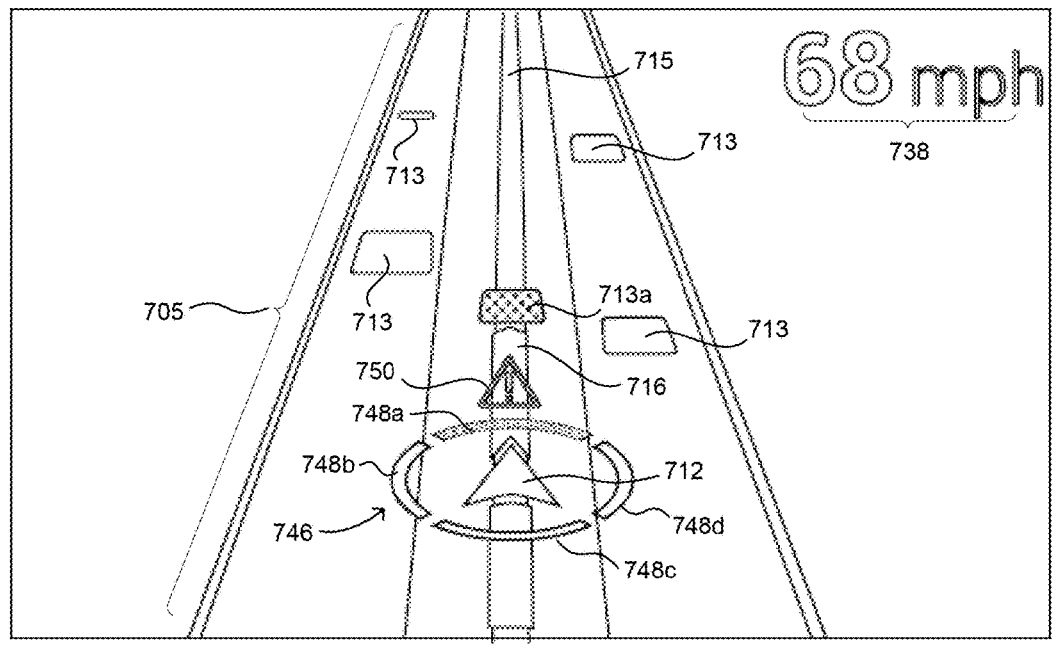
FIG. 17 is an exemplary screen shot in accordance with an aspect of the disclosure.

In another example, a similar procedure to that shown in FIGS. 16 and 17 can be used to alert the passenger of vehicle 101 to the presence of another vehicle approaching the rear of vehicle 101 or otherwise driving at an unsafe distance with respect to vehicle 101. Such a distance can be determined as an absolute distance (e.g., 10 feet) or can be determined by the speed of vehicle 101 or the other vehicle such as by determining a time based following distance. Such a following distance can be determined by the time it would take a following object to reach an instantaneous location of a followed object, given the following object's speed. In an example, a warning indication can be given when another vehicle at a two second following distance or less relative to vehicle 101. This type of warning indication can alert the driver to the reason for a corresponding action taken by system 100, such as changing lanes or speeding up (if conditions and/or applicable speed limits permit). Such notifications can be given simultaneously with or just before actions are taken by the system 100, for example. A similar warning can be given to alert the passenger or driver to a stationary object to the rear of the vehicle 101 when it is in reverse.

Figure 18:
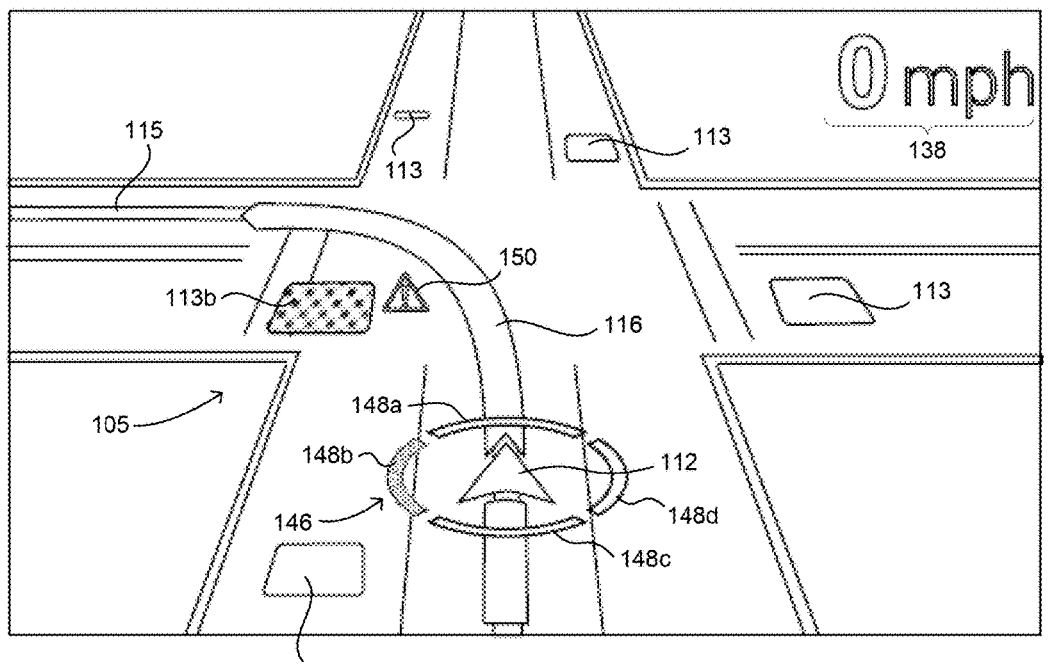
FIG. 18 is an exemplary screen shot in accordance with an aspect of the disclosure.

Computer 110 may also display warnings or indications as discussed above, using notification image 146 and optionally warning images 150 in connection with identified objects in order to inform the passenger that the computer will not take a particular action because of the presence of that identified object. As shown in FIG. 18, vehicle 101 is approaching an intersection. The shape of path 116 indicates that computer 110 will make vehicle 101 perform a left turn. In the example, computer 110 has identified a vehicle, displayed as box 113*b* which will pass through path 116. Computer 110 may change the color of box 113*b* and of segment 148*b* and may further present a warning image 150 adjacent box 113*b* (or segment 148*b*) indicating that computer 110 will not move through the intersection until the identified object associated with box 113*b* is no longer within the path of the vehicle 101. The same type of warning can also be displayed, for example, in connection with a pedestrian or the like crossing the intersection in the path 116 of vehicle 101.

Figure 19:
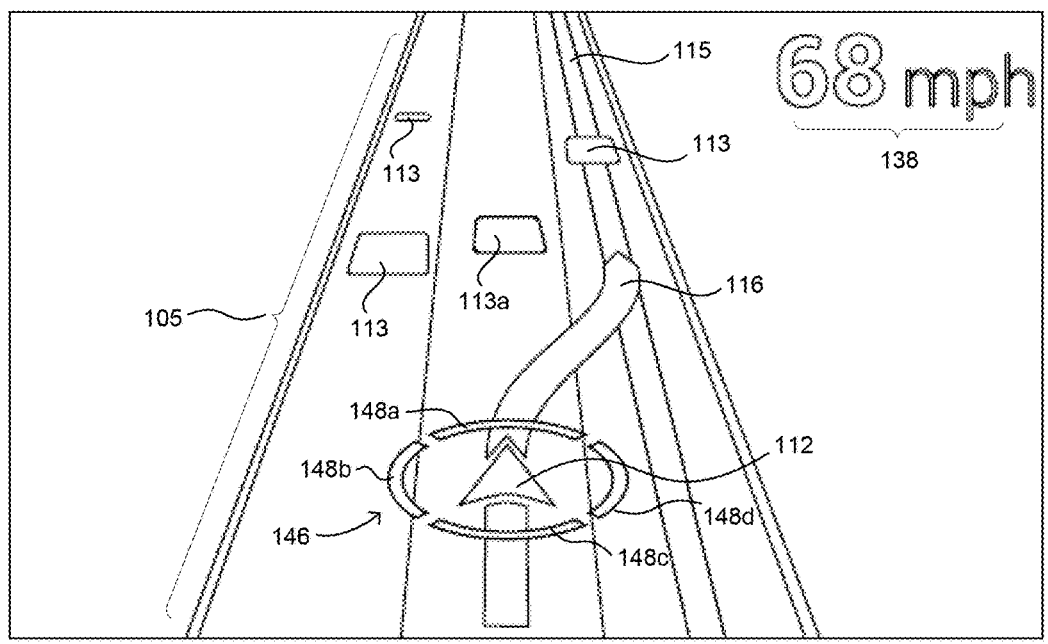
FIG. 19 is an exemplary screen shot in accordance with an aspect of the disclosure.
Figure 20:
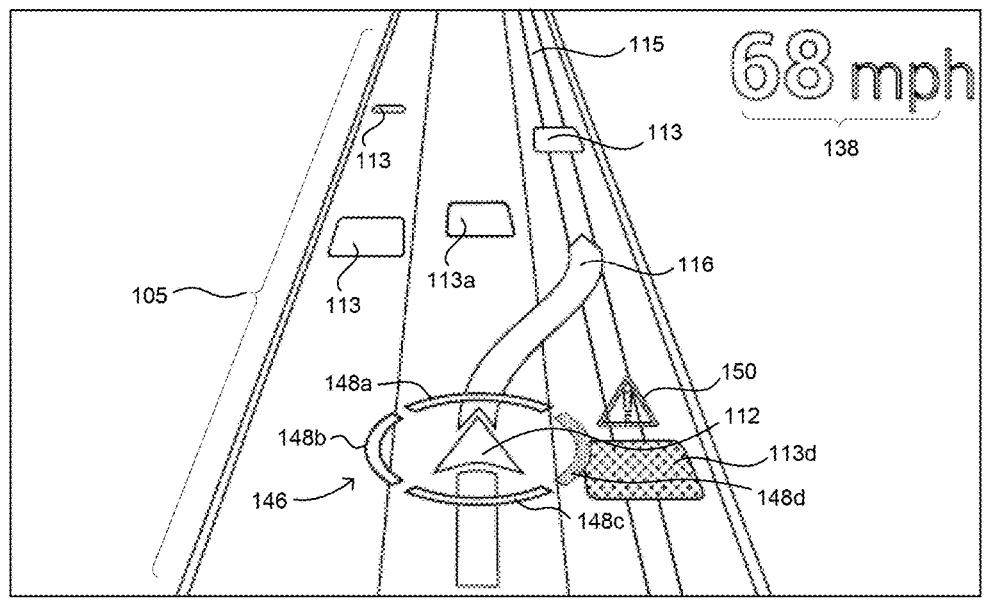
FIG. 20 is an exemplary screen shot in accordance with an aspect of the disclosure.

Computer 110 may also use the display to indicate to the passenger that the vehicle 101 will be changing lanes, but is waiting to do so because of an identified object that makes changing lanes unsafe. As shown in FIG. 19, vehicle 101 is moving along a route 115 indicated by path 116 behind a second vehicle, displayed as box 113*a*. The presentation of segment 148*a* in green, for example, may indicate that vehicle 101 is maintaining an appropriate following distance along path 116 behind the second vehicle. If computer 110 determines a change of lanes is appropriate as shown in FIG. 20, the computer may display path 116 so as to change from within the current lane to the lane to which computer 110 intents to move vehicle 101. This can be done, for example, if the vehicle's route requires the vehicle to take an exit, make a turn, etc. If a third vehicle is present within the lane into which computer 110 would like to move, such as the identified object indicated by box 113*d*, computer will refrain from changing lanes. In some instances, computer may simply wait for the identified object to move from out of an area that makes changing lanes unsafe or may cause vehicle 101 to speed up or slow down (conditions permitting) to position vehicle 101 relative to the identified object so as to make changing lanes appropriate. In either instance, while computer 110 is taking action that includes refraining from changing lanes because of the identified object indicated by box 113*d*, computer 110 can display the notification image shown in FIG. 19. As discussed above, this can include changing segment 148*d* to yellow and can optionally further include changing box 113*d* to yellow (for example) as well and/or presenting a warning image 150 adjacent segment 148*d* or box 113*d*. As vehicle 101, for example, begins to slow down to position itself to appropriately change lanes, computer 110 may maintain the notification state, until changing lanes is appropriate, at which point, the notification image 146 can return to a non-warning, or neutral (e.g., all green) image and any warning image can be removed simultaneously with or just before computer 110 causes vehicle 101 to change lanes.

Additional warning information, such as an escalated warning state as described above can further be presented in the above scenario, for example, if the identified object indicated by box 113*d* itself begins to unsafely change lanes into the lane in which vehicle 101 is traveling. This can be done in connection with computer 110 causing vehicle 101 to take action to avoid a collision with the identified object. Other similar notifications and warnings can also be presented by computer 110 according to other criteria, such as a vehicle moving unsafely into the path of the subject vehicle 100 (either determined by the projected route or inferred by the system 101 during non-autonomous driving) or otherwise being detected within the path. Further, the notification scheme described herein can also alert the driver to the ending of the lane of travel, for example, while driving on a highway. It can also alert the driver to unsafe or illegal actions to be taken (inadvertently or by error) by the driver during non-autonomous driving. In one example vehicle 101 could present such a warning to the driver when the driver begins to make an illegal turn or the like.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The sample values, icons, types and configurations of data described and shown in the figures are for the purposes of illustration only. In that regard, systems and methods in accordance with aspects of the invention may include different physical attributes, data values, data types and configurations, and may be provided and received at different times and by different entities (e.g., some values may be pre-suggested or provided from different sources).

The invention claimed is:

1. An autonomous driving system of a vehicle, the autonomous driving system comprising:
   a first display configured to provide an indicator identifying whether the autonomous driving system is engaged in an autonomous mode;
   a second display configure to display navigation functionality of the autonomous driving system;
   an object detection system configured to detect object information of one or more objects in proximity to the vehicle, the object detection system including at least one of a laser, a camera, radar and sonar;
   a vehicle control system configured to control one or more of braking, acceleration, steering and signaling of the vehicle while in the autonomous mode;
   a user input device configured to receive input regarding the autonomous mode; and
   one or more processors operatively coupled to the first display, the second display, the object detection system, the vehicle navigation system, and the user input device, the one or more processors being configured to:
      receive detected object information of the one or more objects from the object detection system;
      identify a position and speed of a given one of the one or more objects relative to a current position and speed of the vehicle based on the received detected object information;
      generate a notification image corresponding to one or more peripheral areas external to the vehicle;
      update the notification image by modifying at least one peripheral area of the notification image when a first threshold condition of the identified position and speed of the given object relative to the current position and speed of the vehicle is met;

cause the updated notification image to be displayed on either the first display or the second display;

generate a warning indicator for the given object when a second threshold condition of the identified position and speed of the given object relative to the current position and speed of the vehicle is met; and cause the updated notification image and the warning indicator to be displayed on either the first display or the second display, the warning indicator being displayed separate from the updated notification image.

2. The autonomous driving system of claim 1, wherein the one or more processors are further configured to:
   detect a change in the identified position or speed of the given object relative to the vehicle; and
   determine that the first or the second threshold condition is met in response to the detected change.

3. The autonomous driving system of claim 2, wherein the one or more processors are further configured to instruct the vehicle control system to control the vehicle to take corrective action in response to the determination that the second threshold condition is met.

4. The autonomous driving system of claim 1, wherein the warning indicator identifies a characteristic of the given object.

5. The autonomous driving system of claim 1, wherein the one or more processors are further configured to identify an object type for the given object based on the detected object information.

6. The autonomous driving system of claim 1, wherein the one or more processors are further configured to generate a subject vehicle icon representing the vehicle, and to cause the notification image to be displayed adjacent to the subject vehicle icon.

7. The autonomous driving system of claim 1, wherein the one or more processors are further configured to generate a route line for display, the route line indicating a route along which the vehicle is traveling.

8. The autonomous driving system of claim 1, wherein the first display is disposed along a dashboard of the vehicle.

9. The autonomous driving system of claim 1, wherein the user input device is disposed along a center console arranged between driver and passenger seats of the vehicle.

10. The autonomous driving system of claim 1, wherein the notification image includes one or more segments.

11. The autonomous driving system of claim 10, wherein the one or more segments of the notification image are displayable as a multi-segmented shape at least partly surrounding a vehicle icon, the vehicle icon representing the vehicle.

12. The autonomous driving system of claim 11, wherein the multi-segmented shape includes a plurality of arcuate or linear elements.

13. An autonomous driving system of a vehicle, the autonomous driving system comprising:
   a first display element configured to provide an indicator identifying whether the autonomous driving system is engaged in an autonomous mode;
   a second display element configure to display navigation functionality of the autonomous driving system;
   an object detection system configured to detect object information of one or more objects in proximity to the vehicle, the object detection system including at least one of a laser, a camera, radar and sonar;
   a vehicle control system configured to control one or more of braking, acceleration, steering and signaling of the vehicle while in the autonomous mode; and
   one or more processors operatively coupled to the first display, the second display, the object detection system, and the vehicle navigation system, the one or more processors being configured to:
      receive detected object information of the one or more objects from the object detection system;
      identify a position and speed of a given one of the one or more objects relative to a current position and speed of the vehicle based on the received detected object information;
      generate a notification image corresponding to one or more peripheral areas external to the vehicle;
      generate a first indicator for the given object when a threshold condition of the identified position and speed relative to the current position and speed of the vehicle is not met;
      cause the notification image and the first indicator to be displayed on either the first display or the second display; and
      cause a second indicator to be displayed with the notification image and the first indicator on either the first display or the second display when the threshold condition is met, the second indicator providing information about the given object, wherein the second indicator is arranged for display adjacent to and separate from the first indicator.

14. The autonomous driving system of claim 13, wherein the first display element is part of a first display device and the second display element is part of a second display device separate from the first display device.

15. The autonomous driving system of 13, wherein either the first display element or the second display element is further configured to provide information related to an entertainment system of the vehicle.

16. The autonomous driving system of claim 13, wherein the one or more processors are configured to:
   detect a change in the identified position or speed of the given object relative to the vehicle;
   determine that the threshold condition is met in response to the detected change.

17. The autonomous driving system of claim 16, wherein upon determination that the threshold condition is met, the one or more processors are configured to change the first indicator to the second indicator by changing a color of the first indicator.

18. The autonomous driving system of claim 16, wherein the one or more processors are further configured to instruct the vehicle control system to control the vehicle to take corrective action in response to the determination that the threshold condition is met.

19. The autonomous driving system of claim 13, wherein the second indicator is provided to indicate to a passenger of the vehicle that the autonomous driving system will not take a particular action because of a condition associated with the given object.

20. The autonomous driving system of claim 13, wherein the one or more processors are further configured to generate a route line for display, the route line indicating a route along which the vehicle is traveling.

* * * * *